Nov. 4, 1941.　　W. D. FOWLER　　2,261,245
PILOT GAS PRESSURE REGULATOR
Filed March 3, 1941

Inventor
WILLIAM D. FOWLER
by J. H. Adams
Attorney

Patented Nov. 4, 1941

2,261,245

UNITED STATES PATENT OFFICE 2,261,245

PILOT GAS PRESSURE REGULATOR

William D. Fowler, Bakersfield, Calif.

Application March 3, 1941, Serial No. 381,499

6 Claims. (Cl. 50—11)

This invention relates to regulators for controlling the flow of gas at low pressures and within narrow limits, and particularly to one which uses an external source of increased or reduced pressure to actuate a conventional diaphragm-type regulator.

In the operation of petroleum storage tanks, particularly those containing low-boiling refined products such as gasoline, there is usually a continuous evaporation from the surface of the oil. So-called vapor recovery systems which connect the vapor spaces of these tanks together and to a vacuum pump or other type of collector require the use of pressure or vacuum regulating valves that will maintain a pressure of about one inch of water on the vapor spaces of the tanks. These regulator valves are usually of the pilot type, that is a main valve of the diaphragm and spring type is controlled by a pilot regulator which is more sensitive to fluctuations of the pressure in the vapor space on the tank and acts only to control the main regulator valve. Certain of these pilot valves require an external source of gas or air to furnish the power to actuate the main valve. It is desirable to use the pressure differential between the main gas flow line and the atmosphere, this pressure usually amounting to several inches of water.

Heretofore, pilot regulators of this type have been actuated by means of large flexible diaphragms which are expensive to build and difficult to maintain in satisfactory operating conditions. Adjustments are usually difficult to make and, due to the humid and sometimes corrosive conditions of the gas, the small and delicate parts become corroded and stick and are obstructed by deposits that interfere greatly with the successful operation of the pilot regulators.

This invention is adapted to be used in combination with a conventional pressure regulating valve usually placed in a main gas flow line from the vapor space of the tank, a continuous source of reduced pressure such as a vacuum pump being used to withdraw gas from the tank through the regulator when the pressure above the oil in the tank rises to a certain value. The regulator is adapted to be closed when this pressure falls to atmospheric or within one or two inches of water below atmospheric. Specifically, the device illustrated in this example consists of a regulator adapted to control the flow of gas from a source of such a pressure fluid, that is either above or below atmospheric pressure, to the diaphragm of the main regulator so that the latter will be operated by very small changes in pressure, on the order of fractions of an inch of water, in the vapor space of the tank, or in the lines forming the gathering system.

It is an object of this invention to provide a sensitive type of pilot valve to actuate a conventional diaphragm-operated fluid pressure regulator.

Another object is to provide a pilot valve mechanism which is simple and economical to fabricate and which utilizes a liquid and float thereon to actuate the flow control means of the pilot regulator.

Another object is to provide a simple type of pilot regulator which is adapted to be installed upon conventional existing main pressure regulators to control the latter within close limits of pressure variation.

Another object is to provide a single- or double-acting valve adapted to control pressure fluid to and from the diaphragm chamber of a conventional pressure regulator.

These and other objects and advantages of this invention will be apparent from the following description and from the attached drawing, which forms a part of this specification and illustrates a preferred embodiment of the invention.

Figures 1, 2, 3:
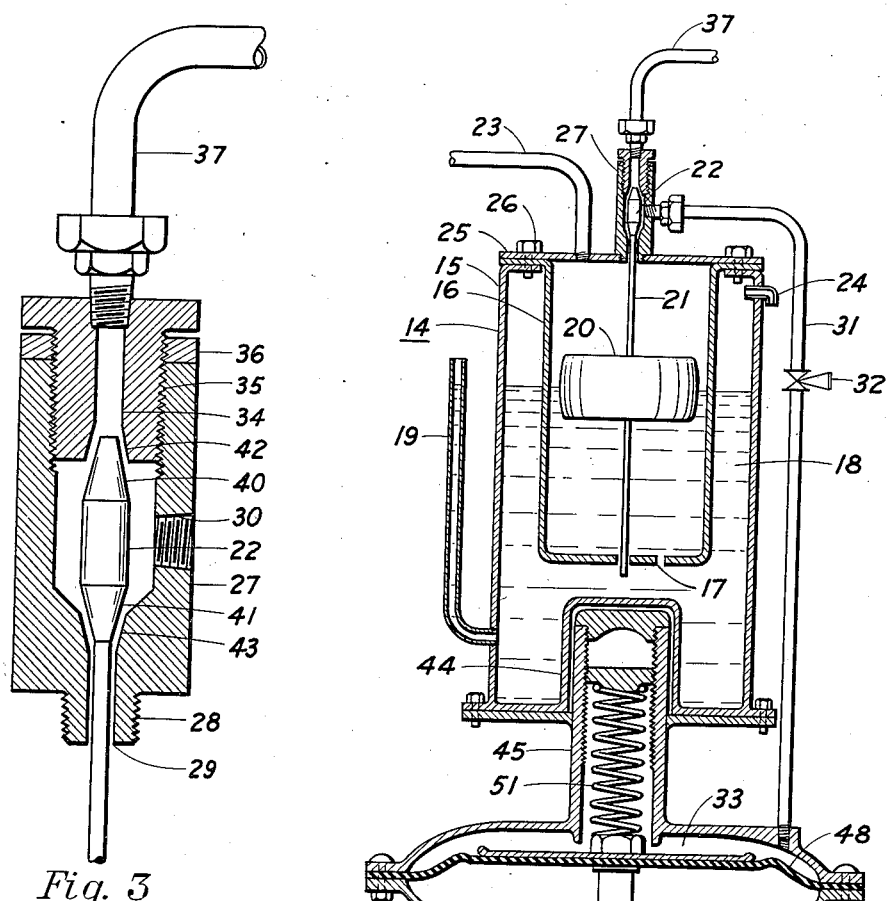
Figure 1 is a diagrammatic illustration of this invention as applied to a system including a tank which forms a source of gas, the latter being withdrawn by means of a vaccum pump through a conventional regulator.
Figure 2 is a vertical sectional view of a specific type of construction for a pilot regulator as applied to a conventional diaphragm actuated valve.
Figure 3 is a vertical sectional view of a valve chamber and a double-acting valve which have been found to be useful in this invention.

Referring to the drawing and particularly to Figure 1, vacuum pump 10 is arranged to withdraw gas from the vapor space of tank 11 through a main flow line 12. The gas discharged from pump 10 may be sent to a gasoline recovery plant or any other disposal means not shown. A main regulator valve 13 is controlled indirectly by the pressure in tank 11 through the medium of the pilot valve generally designated 14.

One preferred embodiment of regulator 14 is shown in Figure 2 and consists of an outer cylindrical container 15 and a concentric inner container 16. A port 17 connects the chambers formed by the inner and outer containers that are partially filled with a liquid 18 which may be water, ethylene glycol or other suitable low freezing and noncorrosive material. The upper level of liquid 18 may be controlled by an overflow 19 which may be made transparent so as to indicate the level of the liquid within the outer container 15. Inside of the inner container 16 is a suitable float 20 which has a guided stem 21 extending upwardly and terminating in a valve member 22.

A conduit 23 leads from main gas flow line 12, at a point near tank 11, or independently connected to tank 11 above the vapor space therein and is adapted to transmit the gas pressure which exists in tank 11 to the float chamber in inner container 16 at a point above the liquid level therein. The outer container 15 is provided with a vent 24 leading to the atmosphere, in an installation where pressures within a few inches of atmospheric are to be maintained.

Outer container 15 and inner container 16 may be flanged inwardly and outwardly, respectively, at their upper ends and closed by means of a cover plate 25 secured by bolts 26. A valve housing 27 is secured to the center of plate 25 by means such as a threaded connection 28 and desirably is made as shown in detail in Figure 3. In this embodiment there are three gas passages or inlets leading into the bore of housing 27, the first being designated 29 and serving to connect the housing 27 and the float chamber. Stem 21 of the float-actuated valve 22 desirably extends into the housing through inlet 29. A side or intermediate inlet 30 is adapted to communicate with a conduit 31 having a throttle valve 32 and leading to the diaphragm chamber 33 of the main gas regulator 13. The purpose of this connection will be explained below. An upper or second gas inlet passage 34, illustrated as being aligned with lower passage 29, is preferably made adjustable, by being incorporated in a threaded bushing 35 adapted to be screwed into and out of a correspondingly threaded bore in housing 27 and locked in position by means of a suitable nut 36. Bushing 35 is bored out to form the upper gas passage 34, the latter adapted to communicate with conduit 37 which is connected to the main gas flow line 12 at a point 38 between the main regulator valve 13 and the vacuum pump 10. Conduit 37 carries the pressure fluid to housing 27, from which it may be directed either to the first gas inlet 29 or the intermediate inlet 30, depending on pressure conditions within float chamber 16.

Valve member 22 is desirably but not necessarily formed with opposed upper and lower tapered faces 40 and 41, respectively. These are adapted to be received in correspondingly tapered seats 42 and 43. Seat 42 is located at the upper end of bore 29 in valve housing 27. Seat 43 is formed at the lower end of bore 34 in the adjustable bushing 35 so that the distance between the two seats may be varied to suit the operating conditions under which the valve 22 is to function.

In Figure 2, outer container 15 is illustrated as being recessed at 44 so that it may be placed over the spring housing 45 of the conventional pressure regulator valve 13. Valve 13 may be of any desired type and consists generally of a body 46 adapted to be connected into line 12 and a diaphragm housing 47 adapted to receive a flexible diaphragm 48. A valve member 49 is adapted to be moved upwardly and downwardly by motion of diaphragm 48 to cooperate with valve seat 50 and regulate the flow of gas through body 46. In this example a spring 51 extends upwardly into spring housing 45 from diaphragm 48 and urges the latter downwardly to close the valve except when there is a reduced pressure in diaphragm chamber 33 above diaphragm 48. Usually a vent 52 in the lower section of diaphragm housing 47 permits atmospheric pressure to be exerted against the lower face of diaphragm 48. Obviously, the arrangement just described for valve 13 could be varied in numerous ways as are well known in this art.

In operation, if the pressure in the vapor space of tank 11 rises above that which is desired, the increased pressure is transmitted through conduit 23 to the space above the liquid 18 in the inner chamber 16 of the pilot regulator 14. This increase in pressure forces liquid 18 through port 17 into the outer container 15, which latter is open to atmosphere through vent 24. As the liquid level in chamber 16 falls, float 20 moves downwardly to close valve 22 against the lower seat 42 in housing 27. This opens the upper passage 34 by moving the tapered face 41 downwardly away from its seat 43 and permits reduced pressure from vacuum pump 10 to be transmitted through conduit 37, passage 34 and side inlet 30 to conduit 31 which in turn will permit the reduced pressure to be effective over the upper surface of diaphragm 48 so that atmospheric pressure will be effective below the diaphragm to raise valve 49 from its seat in the main regulator 13 permitting more gas to be drawn through line 12 by vacuum pump 10. This additional gas withdrawal will reduce the pressure in tank 11 to the desired value.

Conversely, a decrease in pressure in tank 11 below that desired will cause the level of liquid 18 in chamber 16 to rise, urging float 20 and valve 22 upwardly to restrict the flow of gas through conduit 37, passage 39 and conduit 23, thereby permitting gas from conduit 23 to pass from that line into conduit 31. This increases the pressure above diaphragm 48 so that spring 51 may urge it downwardly to move valve 49 toward seat 50 to reduce the gas flow through line 12 to vacuum pump 10. It will be appreciated that a small amount of gas will usually be drawn through conduit 23 into the space above the liquid in inner chamber 16 and thence through passage 29 to the interior of valve housing 27. This condition will obtain, except when the pressure in line 23 rises, closing valve 22 downwardly against seat 42 as outlined above.

The provision of the opposed tapered faces on valve 22 which control the gas flow into and out of the chamber formed within valve housing 27 permits a lag or blow-down period for the system so that main regulator 13 will not be continuously opening and closing but will maintain the pressure in the vapor space of tank 11 within a definite and predetermined range, as will be appreciated by those who are skilled in this art. It will be understood that the source of gas pressure for operating the diaphragm valve 13, this flow of gas being controlled by the pilot valve 22, may be either greater than atmospheric or less than atmospheric pressure, depending upon the construction and arrangement of valve 13 and the conditions that are desired in the vapor space of tank 11 or other container whose internal pressure is to be controlled. Under certain conditions of operation, the lower portion of the valve 22 will be found to be the most effective, as the first gas inlet 29 probably has a greater effect on the operation than the second gas inlet 34.

It is considered that one of the principal features of this invention resides in the provision of a float-operated valve means selectively adapted to control a source of pressure fluid to actuate a diaphragm or equivalent type of valve, the position of the float being responsive to small variations in the pressure within the space from which fluid is withdrawn, and the main valve acting to control the withdrawal of said fluid from said space. It will be appreciated that only a specific form of this invention and one mode of its application have been described and illustrated in this application. Obviously, numerous modifications and changes could be made without departing from the invention and all such modifications and changes that come within the scope of the appended claims are embraced thereby.

I claim:

1. A pilot gas pressure regulator comprising a float chamber adapted to contain a liquid, a float in said chamber, a second chamber communicating with said float chamber below the liquid level, means for connecting said second chamber to the atmosphere, means for impressing the pressure to be controlled upon said float chamber above the liquid level, valve means responsive to the position of said float, a housing for said valve means, a first gas inlet to said housing, said inlet being connected to said float chamber, a second gas inlet to said housing adapted to be connected to a source of pressure gas, said valve means being movable selectively between said inlets to control the flow of gas therethrough, and an intermediate gas connection to said valve housing between said first and second inlets, so constructed and arranged that changes of pressure in said float chamber will cause said valve means to control the pressure of said gas on said intermediate gas connection in a predetermined manner.

2. A pilot gas regulator according to claim 1 in which said first and second gas inlets to said valve housing and said valve means are coaxially arranged.

3. A pilot gas regulator according to claim 1 in which said first and second gas inlets comprise opposed converging tapered seats, and said valve means comprise opposed conical faces adapted selectively to be moved toward one or the other of said seats by a movement of said float.

4. A pilot gas regulator according to claim 1 with the addition of a stem connecting said valve means to said float, said stem extending into said valve housing through said first gas inlet.

5. A pilot gas pressure regulator comprising a float chamber adapted to contain a liquid, a float in said chamber, a second chamber communicating with said float chamber below the liquid level, means for connecting said second chamber to the atmosphere, means for impressing the pressure to be controlled upon said float chamber above the liquid level, valve means responsive to the position of said float, a housing for said valve means, a first gas inlet connecting said housing with said float chamber, a second gas inlet to said housing adapted to be connected to a source of pressure gas, an intermediate gas connection to said valve housing between said first and second inlets, said valve means being movable by said float to control the gas flow through one of said gas inlets, so constructed and arranged that changes of pressure impressed upon said float chamber will cause the said valve means to control the pressure of said gas on said intermediate gas connection in a predetermined manner.

6. A pilot gas regulator according to claim 5 with the addition of a stem for said valve extending through said first gas inlet, said valve comprising a tapered body adapted to be seated in said inlet when said float moves in a predetermined direction.

WILLIAM D. FOWLER.